United States Patent [19]

Flair

[11] Patent Number: 5,513,442
[45] Date of Patent: May 7, 1996

[54] APPARATUS FOR INSPECTING A GEAR

[75] Inventor: Henry J. Flair, Franklin Park, Ill.

[73] Assignee: Illinois Tool Works Inc., Glenview, Ill.

[21] Appl. No.: 343,341

[22] Filed: Nov. 22, 1994

[51] Int. Cl.$^6$ .................... G01B 121/08; G01M 13/02
[52] U.S. Cl. .................... 33/501.19; 33/501.13; 33/501.8; 73/162
[58] Field of Search .......... 33/501.19, 501.13, 33/501.8, 501.7, 501.16; 73/162

[56] References Cited

U.S. PATENT DOCUMENTS

| | | | |
|---|---|---|---|
| 3,031,765 | 5/1962 | Muller | 33/501.13 |
| 3,337,964 | 8/1967 | Anthony | 33/501.19 |
| 3,370,146 | 2/1968 | Matteucci | 73/162 |
| 3,921,304 | 11/1975 | Yagiela | 33/501.19 |
| 4,321,753 | 3/1982 | Fusari | 33/501.8 |
| 4,488,359 | 12/1984 | Mission. | |
| 4,704,799 | 11/1987 | Kobetsky | 33/501.8 |
| 4,911,032 | 3/1990 | Steele et al. . | |
| 5,016,471 | 5/1991 | Och | 33/501.19 |

FOREIGN PATENT DOCUMENTS 0049936  5/1981  Japan ..................... 73/162

*Primary Examiner*—Thomas B. Will
*Attorney, Agent, or Firm*—Dvorak and Traub

[57] ABSTRACT

A master gear for measuring, in a parallel axis gear measuring apparatus, tooth profile, tooth pitch, and tooth thickness of a work gear. The master gear has a plurality of adjacent teeth separated by a tooth spacing that varies as a repeatable sequence of spacings, wherein the master gear contacts only a single tooth of the work gear during measurement of work gear tooth profile and tooth thickness. The master gear contacts only two teeth of the work gear during a transition between measurement of tooth profile of individual teeth of the work gear, wherein tooth pitch is measured during the transition. The master gear also has transverse operating pressure angle dependent on a transverse pressure angle at an outer diameter of the work gear, a transverse pressure angle at a form diameter of the work gear, a transverse pressure angle at a pitch diameter of the work gear, a transverse tooth thickness at a pitch diameter of the work gear, and a pitch diameter of the work gear. In one embodiment, the master gear has helical teeth having a tooth spacing and a gear width dependant on a contact ratio of the work gear. In another embodiment, the master gear has spur teeth for measuring a work gear having spur teeth. The master gear having spur teeth is defined by parameters relating to a pressure angle of an imaginary outer diameter of the work gear and a pressure angle of an imaginary form diameter of the work gear.

9 Claims, 4 Drawing Sheets

APPARATUS FOR INSPECTING A GEAR

FIELD OF THE INVENTION

The present invention generally relates to a master or checking gear for measuring or inspecting tooth profile, tooth pitch, and tooth thickness of a work gear in a parallel axis type gear measuring apparatus.

BACKGROUND OF THE INVENTION

In the past, parallel axis type gear measuring apparatuses measured parameters of a work gear by measuring a change in a center distance between the rotation axes of the work gear and a master gear, wherein the change in center distance was monitored by a mechanical gauge. The change in center distance, however, is a composite signal resulting from many parameters of the work gear and had limited value. The composite signal results from the engagement of more than one tooth of the work gear by the master gear, wherein the change in center distance was a result of measurement components from several teeth of the work gear at one time. More recently, it has been suggested to convert the change in center distance to an electrical signal, wherein the components of the electrical signal are separated by electronically filtering the signal, over different frequency ranges, into its component signals. The component electrical signals correspond to various parameters of the work gear, and therefore provide more precise measurement information about the work gear. For example, the component electrical signals provide measurement information on lead error, nicks, gear size, runout, bore size, angular velocity error, and gear face squareness. Parameters derived by electronic filtering, however, have a limited accuracy, and require costly electronic equipment. Further, the automated gear measurements discussed above do not provide any information on tooth profile, which has generally been measured using time consuming and costly analytical techniques.

In view of the discussion above, there exists a demonstrated need for an advancement in the art of a master gear for checking a work gear, and, in particular, for a master gear that quickly and economically measures gear parameters including tooth profile.

It is therefore an object of the present invention to provide a novel master gear for measuring a work gear in a parallel axis gear measuring apparatus.

It is another object of the present invention to provide a novel master gear that measures tooth profile, tooth pitch, and tooth thickness of the work gear.

It is a further object of the present invention to provide a novel master gear for quickly and economically measuring a work gear, wherein work gear parameters may be measured for each tooth or, in the alternative, may be averaged.

It is also an object of the present invention to provide a novel master gear that contacts only a single tooth of the work gear during measurement of work gear tooth profile and tooth thickness, wherein the measurement is not affected by contact between other teeth of the work gear and the master gear.

It is yet another object of the present invention to provide a novel master gear that contacts only two teeth of the work gear to provide a continuous, smooth, transition between engagement of individual teeth for measurement of tooth profile, wherein tooth pitch is measured during the transition.

It is another object of the present invention to provide a master gear that has a transverse operating pressure angle that depends on a transverse pressure angle at an outer diameter of the work gear, a transverse pressure angle at a form diameter of the work gear, a transverse pressure angle at a pitch diameter of the work gear, a transverse tooth thickness at a pitch diameter of the work gear, and a pitch diameter of the work gear.

It is a further object of the present invention to provide a novel master gear having helical teeth for measuring a work gear having helical teeth, wherein the master gear has a minimum width and tooth spacing that depends on a gear contact ratio.

It is yet a further abject of the present invention to provide a novel master gear having spur teeth for measuring a work gear having spur teeth.

Accordingly, the present invention is directed toward a novel master gear for measuring, in a parallel axis gear measuring apparatus, tooth profile, tooth pitch, and tooth thickness of a work gear. The master gear includes a plurality of adjacent teeth separated by a tooth spacing that varies as a repeatable sequence of spacings, wherein the master gear contacts only a single tooth of the work gear during measurement of work gear tooth profile and tooth thickness. The master gear contacts only two teeth of the work gear during a transition between measurement of tooth profile on teeth of the work gear, wherein tooth pitch is measured during the transition. The master gear has a transverse operating pressure angle dependent on a transverse pressure angle at an outer diameter of the work gear, a transverse pressure angle at a form diameter of the work gear, a transverse pressure angle at a pitch diameter of the work gear, a transverse tooth thickness at a pitch diameter of the work gear, and a pitch diameter of the work gear. In one embodiment, the master gear has helical teeth having a tooth spacing dependant on a contact ratio of the work gear. The width of the master gear with helical teeth is dependent on an involute contact ratio of the work gear, a number of teeth in the work gear, a normal diametral pitch, a helix angle of the work gear, and a factor that compensates for frictional wear on the master gear. In another embodiment, the master gear has spur teeth for measuring a work gear having spur teeth. The master gear having spur teeth is further defined by parameters relating to a pressure angle of an imaginary outer diameter of the work gear and a pressure angle of an imaginary form diameter of the work gear. The additional parameters depend on an involute contact ratio of the work gear, a pressure angle at an outer diameter of the work gear, a pressure angle at a form diameter of the work gear, a generating pressure angle of the work gear, a number of teeth on the work gear, a pitch diameter of the work gear, a tooth thickness at a pitch diameter of the work gear, a pressure angle of an imaginary outer diameter of the work gear, and a pressure angle of an imaginary form diameter of the work gear.

These and other objects, features and advantages of the present invention will become apparent upon consideration of the following Detailed Description of the Invention with the accompanying drawings.

BRIEF DESCRIPTION OF THE DRAWINGS

FIG. 2b is another partial sectional view along the line II—II through a helical tooth checking gear and helical tooth work gear of FIG. 1, wherein the helical tooth work gear and helical tooth checking gear have been rotationally advanced through an angular interval relative to the orientation of FIG. 2a.

FIG. 4b is another partial sectional view along the line II—II through the spur tooth checking gear and spur tooth work gear of FIG. 1, wherein the spur tooth work gear and spur tooth checking gear have been rotationally advanced through an angular interval relative to the orientation of FIG. 4a.

DETAILED DESCRIPTION OF THE INVENTION

Figure 1:
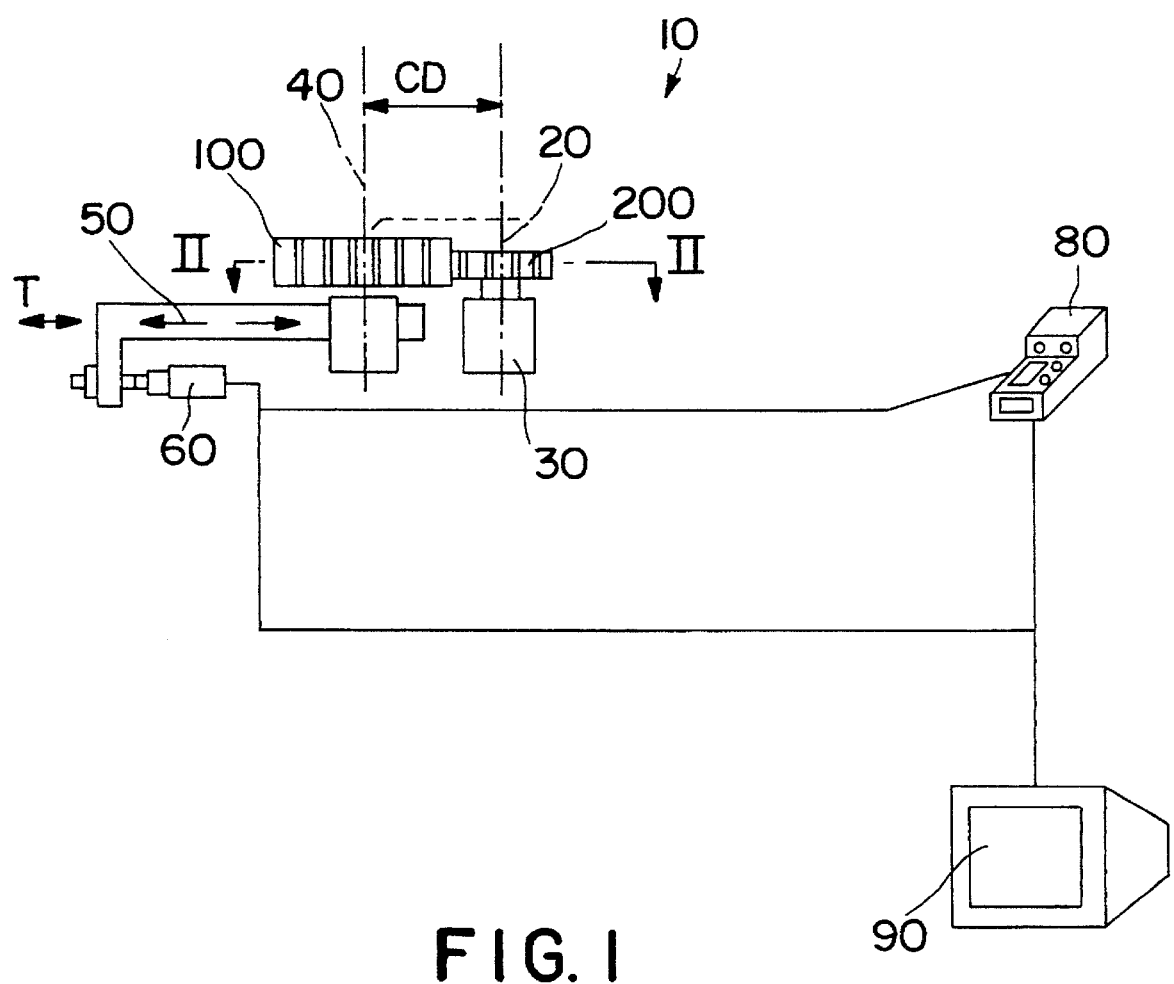
FIG. 1 is a parallel axis type work gear measuring apparatus including the checking gear of the present invention.

FIG. 1 is a parallel axis type gear measuring apparatus 10 generally comprising a checking gear, or master gear, 100 for measuring parameters of a work gear 200. The work gear 200 is coupled to a servo-motor 30 by means known in the art, and rotatable about a fixed axis 20. The checking gear 100 is mounted on an arm 50 and is rotatable about an axis 40, substantially parallel to the axis 20. The arm 50 is movable along a radial T of the master gear 100, transverse to the axis 30. A transducer 60 detects mechanical motion of the arm 50, which corresponds to changes in the center distance, CD, between the axes 20 and 40 of the work gear 200 and checking gear 100. The transducer 60, for example, a linear differential transformer, converts the mechanical motion of the arm 50 to an electrical output signal that is proportional to the change in CD in relation to the change in angular position of the work gear. In one embodiment, the electrical output signal is amplified by an amplifier. The electrical output signal may also be filtered by a filter before or after amplification. The electrical output signal is used as a basis for forming a graphical image of the change of CD versus the change in angular position on a plotter 80, or on a CRT 90. The electrical output signal may also be digitized with an A/D converter and stored in a non-volatile memory and later transformed, filtered and otherwise manipulated by a computing device.

Figure 2A:
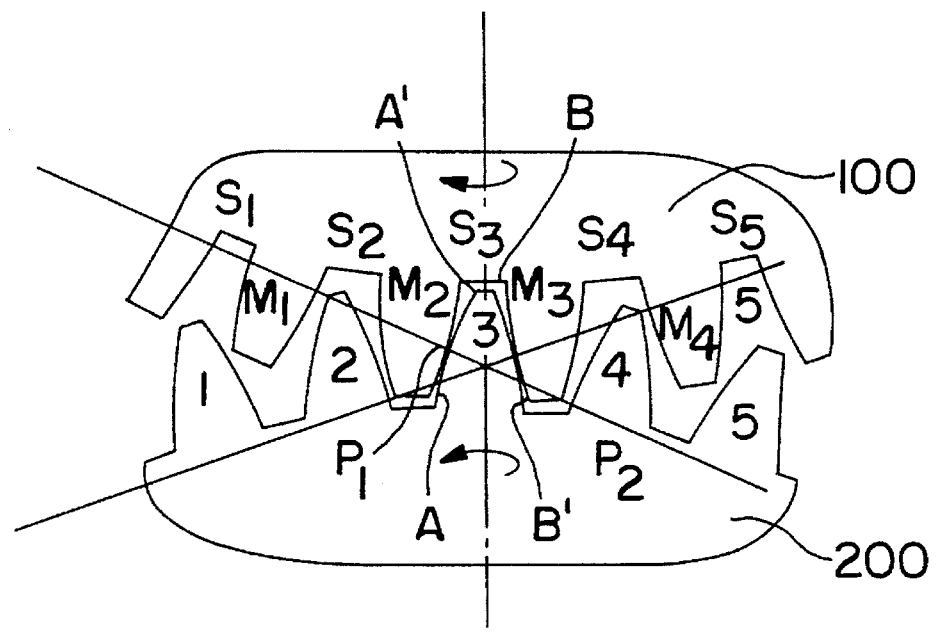
FIG. 2a is a partial sectional view of an infinitely thin plane along the line II—II through a helical tooth checking gear and a helical moth work gear of FIG. 1.
Figure 2B:
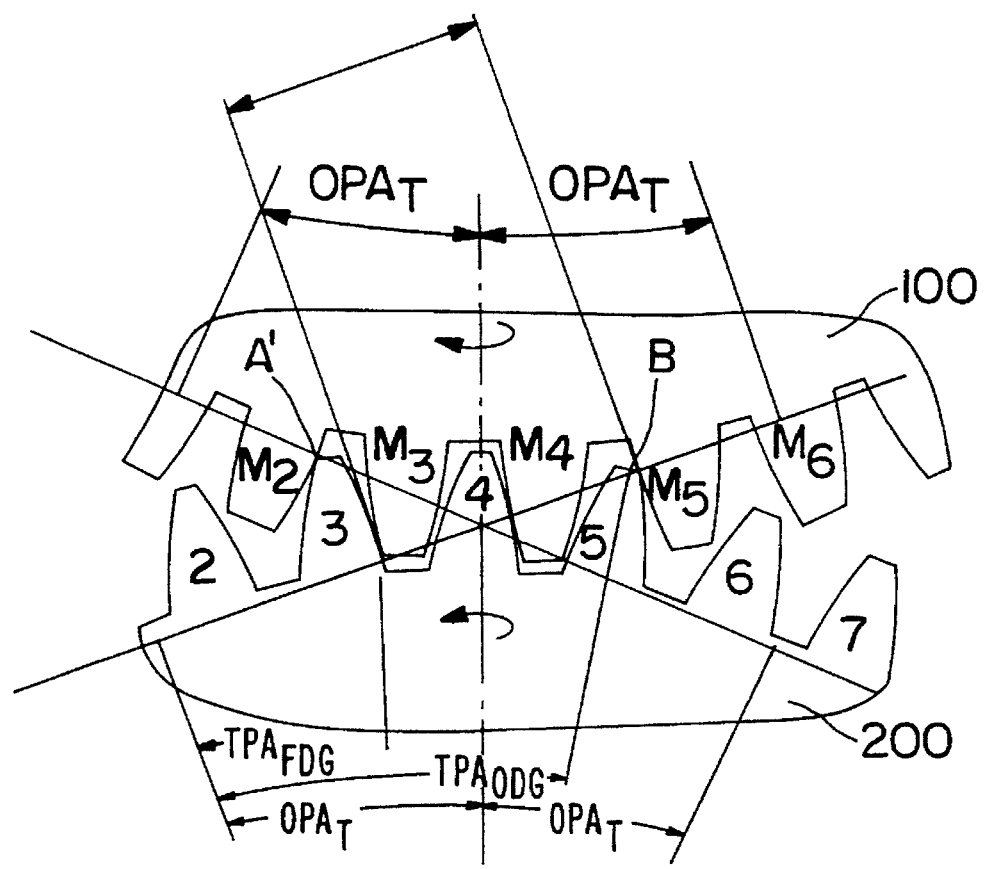

In one embodiment, the checking gear 100 is configured to check a work gear 200 with helical teeth, and having a contact ratio of 2 or less. FIGS. 2a and 2b are partial sectional views of an infinitely thin plane along the line II—II of FIG. 1, wherein the spacing $S_2$, $S_3$, $S_4$, and $S_5$ between teeth $M_1$, $M_2$, $M_3$, and $M_4$ of the checking gear varies as a repeatable sequence wherein every second tooth spacing is narrow in comparison with the first tooth spacing. Specifically, the spacing $S_2$ between teeth $M_1$ and $M_2$ is greater than the spacing $S_3$ between teeth $M_2$ and $M_3$, wherein the spacing $S_2$ is equal to $S_4$, $S_6$ etc., and the spacing $S_1$ is equal to $S_3$, $S_5$. etc.

Figure 3:
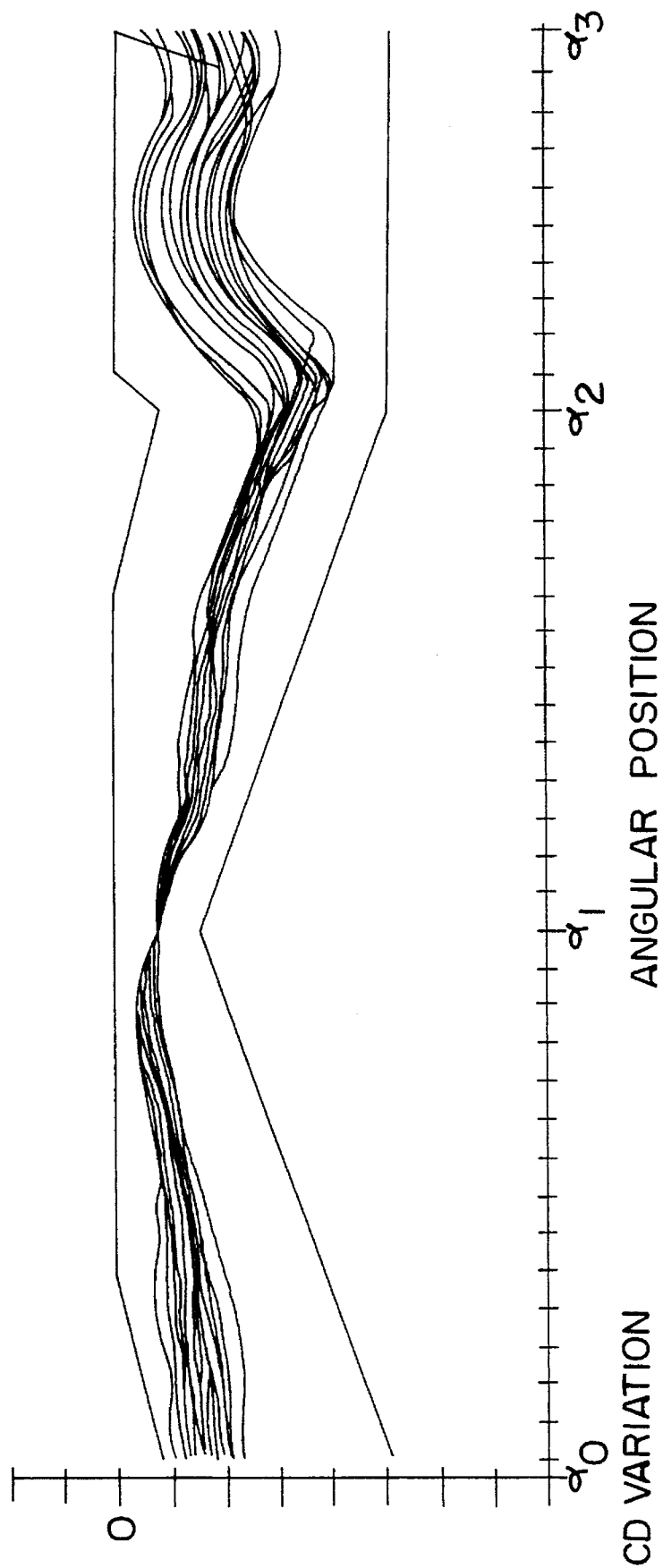
FIG. 3 is an exemplary graphical depiction of the change in center distance, CD, versus the change in angular position of the work gear 200 over an angular interval.

In operation, the checking gear 100 measures several parameters of the work gear 200 including tooth profile or involute, tooth thickness, and tooth pitch. FIG. 3 is a chart showing the change in center distance, CD, versus angular rotation of the work gear 200. During the measurement of work gear tooth profile, the two teeth of the checking gear 100 engage only one tooth of the work gear 200 to ensure that the measurement of the tooth profile is not effected by contact between any other teeth of the checking gear and the work gear. In FIG. 2a, teeth $M_2$ and $M_3$ of the checking gear 100 measure the tooth profile of tooth 3 of the work gear 200. During the measurement of tooth profile, there are only two contact points $P_1$ and $P_2$ between the teeth of the checking gear and the tooth of the work gear. Tooth profile measurement begins when the contact point $P_1$ is at a specified point A on a first side surface, or flank, of the tooth, and the contact point $P_2$ is at a point B, of an opposing, second side surface of the measured tooth. As the measurement proceeds, the contact points $P_1$ and $P_2$ move up and down the respective flanks of the tooth. Tooth profile measurement is complete when the contact point $P_1$ is at point A' on the first flank, and the contact point $P_2$ is at point B' on the second flank. The points A and B' are design specifications, and are always symmetrically located on the opposing flanks of the tooth, but the location may be specified anywhere along the tooth flank, depending on the gear application. The points A' and B, however, are located at the outer diameter of the tooth.

FIG. 2b shows the relative position of the checking gear 100 and the work gear 200 at the end of profile measurement of tooth 3 and at the beginning of profile measurement of tooth 5. During the transition, the checking gear 100 contacts two teeth of the work gear 200, in this example teeth 3 and 5, at four contact points. The flank of tooth $M_2$ contacts the outer diameter of tooth 3 at point A', and the outer diameter of tooth $M_3$ contacts the second flank of tooth 3. Also, the outer diameter of tooth $M_4$ contacts the first flank of tooth 5, and the flank of tooth $M_5$ contacts the outer diameter of tooth 5 at point B. If the work gear is perfect, tooth $M_3$ will contact tooth 3 at B', and tooth $M_4$ will contact tooth 5 at A. The four contact points ensure continuity of engagement between the checking gear and the work gear, and a smooth transition from the individual engagement and measurement of tooth 3, to the individual engagement and measurement of tooth 5. The four contact points, however, exist only during the transition which occurs over an angular interval during the which irregularities in tooth pitch will result in variations in CD as further discussed below. In the exemplary embodiment of FIG. 2a and 2b, wherein the contact ratio of the checking gear and work gear is 2 or less, the checking gear engages only every other tooth of the work gear, which in the example are the odd numbered teeth 1,3, 5 etc. The intermediate, even numbered gears, may be measured by incrementing the checking gear one tooth relative to the work gear. As a practical matter, however, it may be necessary only to obtain average parameter measurements by measuring every other tooth, or in an embodiment discussed below, every third tooth, of the work gear.

FIG. 3 is an exemplary graphical depiction of the change in CD versus the change in angular position of the work gear 200 over an angular interval between $\alpha_0$ and $\alpha_3$. The upper most and lower most curves represent the K-factor tolerance band, which is a design parameter specified for a particular gear application, as is known in the art. Each curve, between the K-factor tolerance band, corresponds to measured changes in tooth profile and tooth pitch for one of several teeth on a gear. In the exemplary embodiment, all of the curves are within the K-factor tolerance band, which indicates that the gear is within the design specification. The change in CD over the interval $\alpha_0$ through $\alpha_1$ is a measurement of change in tooth profile along a first flank of the tooth, and the change in CD over the interval $\alpha_1$ through $\alpha_2$ is a measurement of change in tooth profile along the second, opposing, flank of the same tooth. The change in CD over the interval $\alpha_2$ through $\alpha_3$ is a measurement of change in moth pitch. The change in CD at $\alpha_1$ is a measurement of change in tooth thickness.

The helical checking gear 100 of the present invention has two design parameters, the transverse operating pressure angle, $OPA_T$, and checking gear thickness or width, both of which are a function of parameters of the work gear. The transverse operating pressure angle, $OPA_T$, for a helical checking gear according to the present invention is given by the expression $$\frac{\tan(TPA_{OD}) + \tan(TPA_{FD})}{2} - INV(TPA_G) - \frac{TTT_{PD}}{PD_G}$$

where $TPA_{OD}$ is a transverse pressure angle at an outer diameter of the work gear, $TPA_{FD}$ is a transverse pressure angle at a form diameter of the work gear, $INV(TPA_G)$ is an involute function of a transverse pressure angle at a pitch diameter of the work gear, $TTT_{PD}$ is a transverse tooth thickness at a pitch diameter of the work gear, and $PD_G$ is a pitch diameter of the work gear.

The helical checking gear must also have a minimum width to ensure a continuous transfer between teeth of the checking gear and work gear as discussed above. The minimum width, $W_{m2}$, for a helical checking gear with a contact ratio of 2 or less is given by the expression $$\frac{\pi(2 - CR_{INV})}{NDP\sin(HA_G)} + K_W$$

where $CR_{INV}$ is an involute contact ratio of the work gear given by the expression $$\frac{N_G}{2\pi} (\tan(TPA_{OD}) - \tan(TPA_{FD}))$$

where $N_G$ is a number of teeth in the work gear, $TPA_{OD}$ and $TPA_{FD}$ are defined above, NDP is a normal diametral pitch, $HA_G$ is a helix angle of the work gear, and $K_w$ is a factor that compensates for frictional wear on the checking gear.

The transverse operating pressure angle, $OPA_T$, for a helical checking gear having a contact ratio between 2 and 3 is the same as for a helical gear with a contact ratio of 2 or less as discussed above. In the case of a helical checking gear with a contact ratio between 2 and 3, however, the spacing between the teeth varies as a repeatable sequence wherein even third tooth spacing is narrow in comparison with the first and second tooth spacings. Also, the minimum width, $W_{m3}$, of the helical checking gear with a compact ratio between 2 and 3 is given by the expression $$\frac{\pi(3 - CR_{INV})}{NDP\sin(HA_G)} + K_W$$

where the variables are defined above.

Figure 4A:
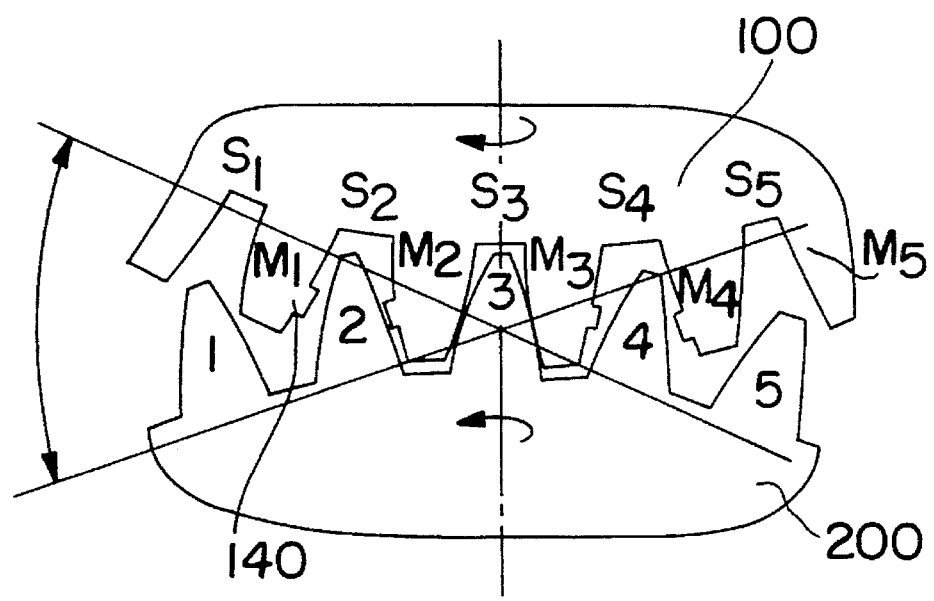
FIG. 4a is a partial sectional view of an infinitely thin plane along the line II—II through a spur tooth checking gear and a spur moth work gear of FIG. 1.
Figure 4B:
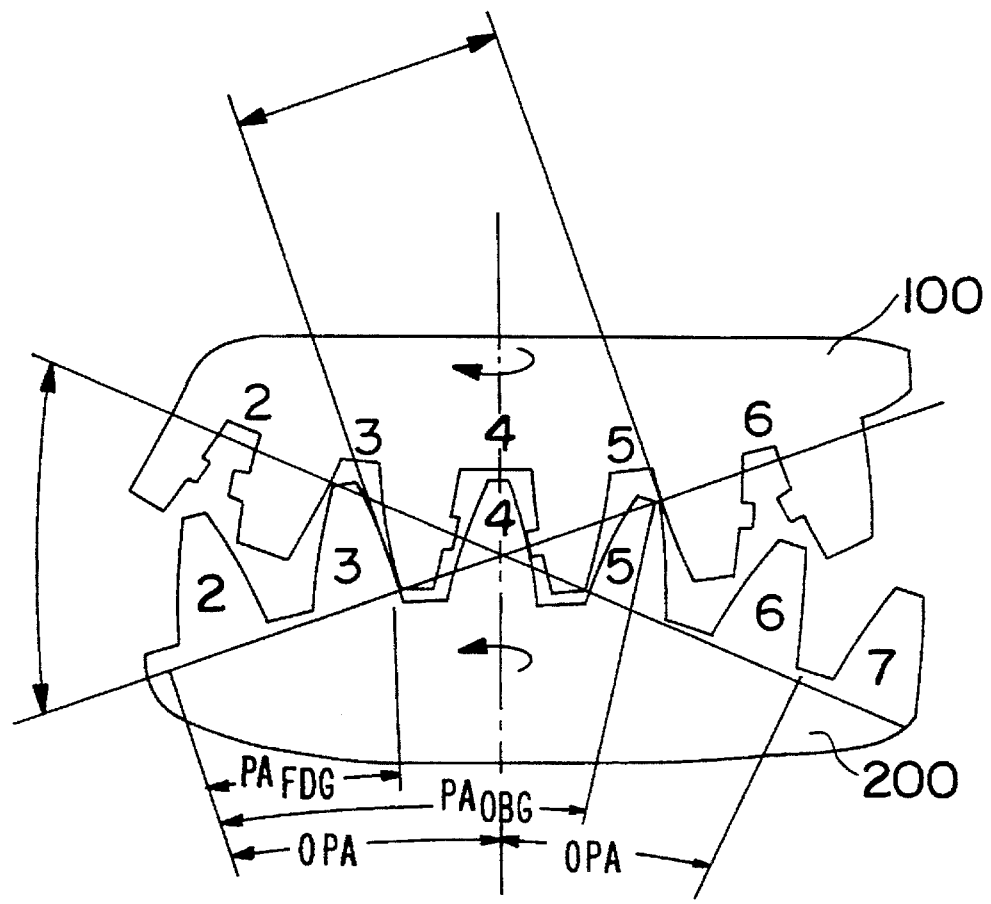

In an alternative embodiment, the checking gear of the present invention has spur teeth to measure a work gear with spur teeth. FIGS. 4a and 4b are, again, partial sectional views of an infinitely thin plane along the line II—II of FIG. 1, wherein the gears have spur teeth. The spacing between every other tooth of the checking gear varies as a repeatable sequence of spacings which includes a first wide tooth spacing and a second comparatively narrow tooth spacing. The wide spacing as defined by a first and second flank of adjacent first and second teeth. The flanks of the teeth defining the wide spaces $S_2$, $S_4$, etc., each include a stud 140 extending in the wide space therebetween, which may be formed by grinding process.

A checking gear having spur teeth has a transverse operating pressure angle, $OPA_T$, which is determined by the same expression given above as in the case for a master gear having helical teeth. A master gear having spur teeth, however, is further defined by parameters relating to a pressure angle of an imaginary outer diameter of the work gear, $PA_{ROD}$, expressed as $$\tan(PA_{OD}) - \frac{2\pi}{N_G} (CR_{INV} - 1)$$

and a pressure angle of an imaginary form diameter of the work gear, $PA_{RFD}$, expressed as $$\tan(PA_{OD}) - \frac{2\pi}{N_G}$$

where $CR_{INV}$ is an involute contact ratio of the work gear is expressed as $$\frac{(\tan(PA_{OD}) - \tan(PA_{FD}))N_G}{2\pi}$$

wherein $PA_{OD}$ is a pressure angle at the outer diameter of the work gear, $PA_{FD}$ is a pressure angle at the form diameter of the work gear, $N_G$ is a number of teeth on the work gear, $PA_{ROD}$ is a pressure angle of an imaginary outer diameter of the work gear, and $PA_{RFD}$ is a pressure angle of an imaginary form diameter of the work gear.

The foregoing is a description enabling one of ordinary skill in the art to make and use the preferred embodiments of the present invention. It will be appreciated by those skilled in the an that there exists variations, modifications and equivalents to the embodiments disclosed herein. The present invention therefore is to be limited only by the scope or the appended claims.

What is claimed is:

1. A master gear for measuring, in a parallel axis gear measuring apparatus, tooth profile, tooth pitch, and tooth thickness of a work gear, the master gear comprising:

a plurality of adjacent teeth separated by a tooth spacing that varies as a repeatable sequence of spacings, the master gear contacting only a single tooth of the work gear during measurement of work gear tooth profile and tooth thickness; and a transverse operating pressure angle, $OPA_T$, expressed as $$\frac{\tan(TPA_{OD}) + \tan(TPA_{FD})}{2} - INV(TPA_G) - \frac{TTT_{PD}}{PD_G}$$

where $TPA_{OD}$ is a transverse pressure angle at an outer diameter of the work gear, $TPA_{FD}$ is a transverse pressure angle at a form diameter of the work gear, $INV(TPA_G)$ is an involute function of a transverse pressure angle at a pitch diameter of the work gear, $TTT_{PD}$ is a transverse moth thickness at a pitch diameter of the work gear, and $PD_G$ is a pitch diameter of the work gear.

2. The master gear of claim 1, wherein the master gear further comprises helical teeth for measuring a work gear having helical teeth, and the master gear has a minimum width, the master gear contacting only two teeth of the work gear during a transition between measurement of tooth profile on teeth of the work gear, wherein tooth pitch is measured during the transition.

3. The master gear of claim 2, wherein the repeatable sequence of spacings between the plurality of adjacent teeth includes a first wide tooth spacing and a second comparatively narrow tooth spacing.

4. The master gear of claim 2, wherein the repeatable sequence of spacings between the plurality of adjacent teeth includes a first wide tooth spacing, a second wide tooth spacing, substantially the same width as the first wide tooth spacing, and a third comparatively narrow tooth spacing.

5. The master gear of claim 3, wherein the master gear has a contact ratio of 2 or less, and the minimum width, $W_{m2}$, is expressed as $$\frac{\pi(2 - CR_{INV})}{NDP\sin(HA_G)} + K_W$$

where $CR_{INV}$ is an involute contact ratio of the work gear expressed as $$\frac{N_G}{2\pi}(\tan(TPA_{OD}) - \tan(TPA_{FD}))$$

where $N_G$ is a number of teeth in the work gear, NDP is a normal diametral pitch, $HA_G$ is a helix angle of the work gear, and $K_w$ is a factor that compensates for frictional wear on the master gear.

6. The master gear of claim 4, wherein the master gear has a contact ratio between 2 and 3, and the minimum width, $W_{m3}$, is expressed as $$\frac{\pi(3 - CR_{INV})}{NDP\sin(HA_G)} + K_W$$

where $CR_{INV}$ is an involute contact ratio of the work gear expressed as $$\frac{N_G}{2\pi}(\tan(TPA_{OD}) - \tan(TPA_{FD}))$$

where $N_G$ is a number of teeth in the work gear, NDP is the normal diametral pitch, $HA_G$ is a helix angle of the work gear, and $K_w$ is a factor that compensates for frictional wear on the master gear.

7. The master gear of claim 1, wherein the master gear has spur teeth for measuring a work gear having spur teeth.

8. The master gear of claim 7, wherein the repeatable sequence of spacings between the plurality of adjacent teeth includes a first wide tooth spacing and a second comparatively narrow tooth spacing, the wide spacing defined by a first and second flank of adjacent first and second teeth, each flank defining the wide spacing having a stud extending into the wide spacing therebetween.

9. The master gear of claim 8, wherein the master gear having spur teeth is further defined by parameters relating to a pressure angle of an imaginary outer diameter of the work gear, $PA_{ROD}$, expressed as $$\tan(PA_{OD}) - \frac{2\pi}{N_G}(CR_{INV} - 1)$$

and a pressure angle of an imaginary form diameter of the work gear, $PA_{RFD}$, expressed as $$\tan(PA_{OD}) - \frac{2\pi}{N_G}$$

where $CR_{INV}$ in an involute contact ratio of the work gear is expressed as $$\frac{(\tan(PA_{OD}) - \tan(PA_{FD}))N_G}{2\pi}$$

wherein $PA_{OD}$ is a pressure angle at an outer diameter of the work gear, $PA_{FD}$ is a pressure angle at a fore diameter of the work gear, $N_G$ is a number of teeth on the work gear, $PA_{ROD}$ is a pressure angle of an imaginary outer diameter of the work gear, and $PA_{RFD}$ is a pressure angle of an imaginary form diameter of the work gear.

* * * * *